United States Patent Office 3,062,829
Patented Nov. 6, 1962

3,062,829
ANIONIC BITUMINOUS EMULSIONS

James R. Wright and Edward W. Mertens, El Cerrito, Calif., assignors to California Research Corporation, San Francisco, Calif., a corporation of Delaware
No Drawing. Filed Feb. 23, 1960, Ser. No. 10,065
10 Claims. (Cl. 252—311.5)

This invention relates to improvements in oil-in-water type anionic butuminous emulsions, and more specifically, to the preparation of anionic asphalt emulsions of improved viscosity and adhesion.

While anionic oil-in-water bituminous emulsions are well known in the art, some bitumens, for instance, certain types of Venezuelan and California asphalts, heretofore have been considered unsuitable for the preparation of oil-in-water emulsions, because they tended to form viscous emulsions which could not be readily handled by conventional pumping and spraying equipment. Furthermore, surface-coatings achieved with the aid of emulsions prepared from such difficult-to-handle asphalts did not adhere satisfactorily to the base-surface of conventional stone aggregate.

With the increasing popularity of asphalt-type pavements, and with the growing use of the so-called "Motopaver" equipment for the application of asphalt emulsions to the road bed, it becomes continuously more desirable to be able to enlarge the source of supply of asphalts suitable for use in paving emulsions by finding means of reducing the viscosity of these emulsions and of enhancing simultaneously the adhesion property thereof.

Various materials have been proposed as additives likely to reduce viscosity and to improve adhesion and/or other desirable properties of asphalts with varying degrees of success. Some materials, while successful in reducing viscosity, adversely affect the adhesion property; on the other hand, other additives while providing satisfactory adhesion, cannot reduce viscosity and, in fact, tend to increase it.

Therefore, discovery that certain polyamide materials, when introduced in comparatively small but effective amounts into quick-breaking anionic bituminous and, in particular, into quick-breaking anionic asphalt emulsions will desirably reduce the viscosity of the emulsions and impart a better degree of adhesion of the asphalt binder thereof to the aggregate, represents a very fortunate and significant advance in the art of asphalt emulsions.

The term quick-breaking anionic asphalt emulsions, as employed in the instant description, refer to the emulsions designated in the ASTM Standard Specification D977–53 as RS–1 and RS–2 (Rapid-Setting) asphalt emulsions, characterized by residue values from about 50 to about 75%, and preferably from about 55 to about 70%, and viscosities which range from about 20 to about 100 seconds Saybolt-Furol at 77° F. for RS–1 type emulsions and from about 75 to about 400 seconds Saybolt-Furol at 122° F. for RS–2 type emulsions.

The particular effective polyamide additives are resinous solid to semi-solid to liquid materials obtained by the reaction of a certain polyfunctional acid, namely polymerized linoleic acid, and, preferably, dimerized linoleic (dilinoleic) acid, with a substantially linear polyalkylene polyamine in which the alkylene units contain from 2 to 4 carbon atoms and are present in a number from 1 to 4. Polyamides prepared by the reaction of dilinoleic acid and polyethylene polyamines in which the number of ethylene units is one less than the number of amine units are particularly suitable for use in the manufacture of anionic asphalt emulsions. In all events, operative polyamide materials are characterized by average molecular weights in the range from about 3000 to about 6500 and by softening points not higher than 300° F. (ASTM D36–26 method) and will effectively reduce emulsion viscosity and improve adhesion if present in the emulsion in an amount which may range from 0.1 to 1.5%, based on the weight of the finished emulsion, preferably from 0.1 to 0.75%.

Typical polyamide additives are condensation products of dilinoleic acid and polyalkylene polyamines, such as ethylene diamine, diethylene triamine, propylene diamine, isopropylene diamine, tetraethylene pentamine, dibutylene triamine, and the like. These materials are made available in commerce, for instance, by General Mills, Inc., Chemical Division, of Kankakee, Illinois, under the general designation of "Versamids," and can be prepared in accordance with the several processes described by A. G. Hovey, in vol. 2, No. 1, fall 1947 issue of "Progress Thru Research," published by General Mills, Inc.

The introduction of the polyamide additives into an anionic bituminous emulsion can be achieved, for instance, by admixing the required amount of a particular polyamide, heated if necessary to the state of fluidity, to the asphalt likewise heated to a temperature in the range from about 225 to about 300° F., and stirring the mixture thoroughly to insure proper distribution of the polyamide. Thereupon, the asphalt-polyamide mixture is emulsified in water, and the resulting emulsion product may be stored prior to being tested for its practical suitability and compliance with the specifications, and prior to the actual use in surfacing or paving work.

Another method of introducing the polyamide additive into an anionic bituminous emulsion consists in dissolving a polyamide, e.g., material known in the trade as "Versamid 110" and characterized by an acid number of about 85, in dilute caustic with stirring. The soap thus formed by a portion of the polyamide acts as an emulsifier, and the resulting polyamide emulsion or suspension can then be added to water which is to be used to emulsify bitumen, such as asphalt, in a conventional manner with the aid of a suitable available anionic emulsifier or emulsifying base. In all instances, care must be taken that the pH of the water for emulsifying bitumen is such that the pH of the ultimate finished emulsion is alkaline.

The following test data are offered to illustrate unexpected significant viscosity reduction and increase in the adhesion property, occasioned by the presence of polyamide additives when used in anionic bituminous emulsions in accordance with the invention.

EXAMPLE I

The emulsion for this series of tests was prepared with 63% by weight of a Venezuelan 200–300 penetration asphalt, 0.07% sodium hydroxide as the emulsifying base, and 37% of water. For different samples of this emulsion (3 liter samples), the polyamide material was added to the corresponding asphalt phase prior to emulsification in varying amounts which ranged from 0.25 to 1.0% by weight of the finished emulsion. This polyamide was a soft, tacky resin obtained by condensation of dilinoleic acid and diethylene triamine and sold by General Mills, Inc. It had an average molecular weight in excess of 3000, an acid number of about 85, and was fluid at room temperature.

Following emulsification, the emulsion was allowed to stand overnight, whereupon viscosity at 122° F. in seconds was determined in accordance with ASTM method D–244 in a Saybolt-Furol viscometer, while the adhesion was ascertained in percent of the area of the surface of stone aggregate which remained coated by asphalt after the so-called "boiling test." This test is carried out as follows:

100 grams of dry Rhyolite aggregate, passing a ⅜" sieve and retained on No. 4 sieve, is weighed into a 16-ounce tin box. Eight grams of the emulsion heated to 120° F. is added to the aggregate and mixed thoroughly therewith. The mixture is then placed in an oven for 24 hours at 200° F. After this oven cure, the contents are thoroughly remixed to obtain complete coating of the aggregate. A 50-gram sample of this cured mixture is then dropped into 400 cc. of boiling distilled water in a 600 cc. beaker and stirred at 60 r.p.m. for one minute. The beaker is then removed from the fire, and any asphalt film on the surface of the water is withdrawn with the aid of absorbent paper. Thereupon, the sample is removed and placed to be air-dried on absorbent paper. An estimate of the average area of the aggregate surface still coated with asphalt is made and rated in percent. Satisfactory adhesion is achieved when at least 75% or more of the total aggregate surface remains coated.

*Table I*

| Run No. | Polyamide Additive in percent by Wt. | Viscosity at 122° F. in SSF | Adhesion in percent |
| --- | --- | --- | --- |
| 1 | | 789 | 40 |
| 2 | 0.25 | 377 | 85 |
| 3 | 0.50 | 37 | 95 |
| 4 | 0.75 | 21 | 95 |
| 5 | 1.00 | 17 | 95 |

The results in Table I clearly point out that the addition of polyamide in accordance with the invention results in a significant reduction of viscosity and an increase of adhesion, so that the polyamide-containing emulsion can be easily handled by the applicator and will possess adhesion as recommended in the industrial specifications for quick-breaking asphalt emulsions (RS types of ASTM Standard Specification D-977).

EXAMPLE II

In a second series of tests, quick-breaking asphalt emulsions of RS-2 type have been prepared with 63% of the same Venezuelan asphalt as in the preceding series and 37% of water, using 0.11% by weight of potassium hydroxide as the emulsifying base and, in addition, 0.2% of potassium chromate to counteract the detrimental effect of the excess of hydroxide on the adhesion property. This chromate salt is well known in the art as an adhesion improver. The emulsions have been treated with varying amounts of a polyamide material sold by General Mills, Inc., under the designation of "Versamid 115." This resin is a viscous fluid characterized by an amine value of 210-230. The results of viscosity and adhesion determinations, carried out as described above after overnight storage and at 120° F., are shown in the following Table II.

*Table II*

| Run No. | Polyamide Addition in percent by Wt. | Viscosity at 122° F. in SSF | Adhesion in percent |
| --- | --- | --- | --- |
| 1 | | 467 | 50 |
| 2 | 0.05 | 405 | 70 |
| 3 | 0.10 | 261 | 80 |
| 4 | 0.20 | 58 | 95+ |

Again, the reduction of viscosity and improvement of adhesion, owing to the addition of the polyamide resin, is clearly apparent.

EXAMPLE III

In another series of tests, emulsions were prepared with 60% by weight of the same Venezuelan 200-300 penetration asphalt, 40% of water, and 0.1% of sodium hydroxide as the emulsifying base. Different polyamide resins supplied by General Mills, Inc., under the generic designation of "Versamids" have been added in an amount equal to 0.5% based on the weight of the finished emulsions. Again, viscosity in seconds at 122° F. in a Saybolt-Furol viscometer and adhesion in percent by the "boiling test" have been determined, after the prepared emulsion was stored overnight. The following tabulation shows the reduction in viscosity and improvement of adhesion occasioned by the presence of these various polyamide resins.

*Table III*

| Run No. | Polyamide Additive | | | | Viscosity at 122° F. in SSF | Adhesion in percent |
| --- | --- | --- | --- | --- | --- | --- |
| | Name | Amt. in percent Added | Aver. Mol. Wt. | Soft Pt. | | |
| 1 | | | | | 498 | 15 |
| 2 | Versamid 115 | 0.5 | | Viscous Fluid. | 106 | 90 |
| 3 | Versamid 100 | 0.5 | 3,000-6,500 | 43-53 | 108 | 80 |
| 4 | Versamid 950 | 0.5 | 3,000-6,500 | 95-105 | 90 | |
| 5 | Versamid 940 | 0.5 | 3,000-6,500 | 105-115 | 176 | |
| 6 | Versamid 930 | 0.5 | 6,000-9,000 | 105-115 | 147 | |

The results in Table III again point out that the addition of polyamides in accordance with the invention reduces viscosity and improves the adhesion of the asphalt binder to the aggregate.

EXAMPLE IV

In still another series of tests, emulsions have been prepared with 63% of the same Venezuelan asphalt, 37% of water, 0.11% of potassium hydroxide as the emulsifying base and 0.19% of potassium chloride, added to reduce the detrimental effect of the hydroxide on the adhesion property. However, potassium chloride of itself is not a good adhesion improver. In two of the runs (Nos. 2 and 3), 0.2% of weight of polyacrylamide materials, sold by American Cyanamid and Chemical Corporation under the names of "Polyacrylamide 50" and "Polyacrylamide 100" was added to each sample of the emulsion, and in another test run (No. 4), 0.2% by weight of a polyamide additive, namely, "Versamid 110," was added to the emulsion. The results of the viscosity and adhesion determinations, carried out after storing the emulsions overnight at 120° F., are tabulated below.

*Table IV*

| Run No. | Amide Added as 0.2% by Wt. | Viscosity at 122° F. in SSF | Adhesion in percent |
| --- | --- | --- | --- |
| 1 | | 265 | 40 |
| 2 | Polyacrylamide 50 | 649 | 30 |
| 3 | Polyacrylamide 100 | 675 | 35 |
| 4 | Versamid 110 | 304 | 65 |

The results again clearly point out that polyamides added in accordance with the invention, despite the adverse effect of potassium chloride on emulsion viscosity, kept this viscosity within the range set forth in the specifications and substantially improved the adhesion. Addition of polyacrylamides, on the other hand, resulted in continuously high, off-specification viscosity and in a low degree of adhesion.

It is to be understood that, although the illustrative examples in the aforegiven description of the invention relate to the preparation of anionic asphalt emulsions, since the use of such asphalt emulsions constitutes at present one of the more important practical applications of bituminous materials, emulsions of other such materials, for instance, gilsonite, pitch, coal-tar, and the like, can be similarly improved by the addition thereto of polyamide resins in accordance with the invention.

The above description and examples are given solely to illustrate the invention, and any variations apparent to those skilled in the art are intended to be includible in the scope of the annexed claims.

Then invention as described hereinbefore and claimed in the annexed claims relates only to anionic bituminous emulsions. Although many of the techniques used in the practical applications of anionic bituminous emulsions, for instance, in applying the anionic asphalt emulsions for road-paving construction and repair work, can be successfully adapted in the use of cationic bituminous emulsions for like work, nevertheless a large number of fundamental distinctions exist between these two types of emulsions. These distictions render impossible prediction of the behavior of cationic emulsions containing a given additive on the basis of the behavior of an anionic emulsion containing the same additive.

Therefore, when surprisingly it has been observed that the polyamide resins, found to be effective in reducing the viscosity and enhancing the adhesion of anionic bituminous emulsions as described hereinbefore, occasion a similar reduction of viscosity and an improvement of adhesion on being added to cationic bituminous emulsions, another patent application was prepared and is now being filed under Serial No. 10,106, on the same date and concurrently with the present application, to claim as a separate invention improvements in cationic bituminous emulsions due to the addition thereto of polyamide resins.

We claim:

1. An oil-in-water type anionic bituminous emulsion consisting essentially of from about 50 to about 75% by weight of bitumen; an alkali metal base in an amount sufficient to emulsify the bitumen in water and to make the pH of the finished emulsion alkaline; from about 0.1 to about 1.5% by weight of a polyamide product of condensation of polymerizezd linoleic acid and a polyalkylene polyamine, the molecule of which is formed by $C_2$–$C_4$ alkylene units less than 5 in number and one unit less than the number of amine units, said condensation product being characterized by an average molecular weight in the range from about 3,000 to about 6,500 and a softening point less than about 300° F.; and water, as the continuous phase of the emulsion, to make up 100% by weight.

2. An emulsion as defined in claim 1 wherein said bitumen is asphalt.

3. An oil-in-water type anionic bituminous emulsion consisting essentially of from about 50 to about 75% by weight of bitumen; an alkali metal base in an amount sufficient to emulsify the bitumen in water and to make the pH of the finished emulsion alkaline; from about 0.1 to about 0.75% by weight of a polyamide product of condensation of polymerized linoleic acid and a polyalkylene polyamine, the molecule of which is formed by $C_2$–$C_4$ alkylene units less than 5 in number and one unit less than the number of amine units, said condensation product being characterized by an average molecular weight in the range from about 3,000 to about 6,500 and a softening point less than about 300° F.; and water, as the continuous phase of the emulsion, to make up 100% by weight.

4. An emulsion as defined in claim 3 wherein said bitumen is asphalt.

5. An oil-in-water type anionic bituminous emulsion consisting essentially from about 55 to about 70% by weight of bitumen; an alkali metal base in an amount sufficient to emulsify the bitumen in water and to make the pH of the finished emulsion alkaline; from about 0.1 to about 1.5% by weight of a polyamide product of condensation of polymerized linoleic acid and a polyalkylene polyamine, the molecule of which is formed by $C_2$–$C_4$ alkylene units less than 5 in number and one unit less than the number of amine units, said condensation product being characterized by an average molecular weight in the range from about 3,000 to about 6,500 and a softening point less than about 300° F.; and water, as the continuous phase of the emulsion, to make up 100% by weight.

6. An emulsion as defined in claim 5 wherein said bitumen is asphalt.

7. An oil-in-water type anionic bituminous emulsion consisting essentially of from about 50 to about 75% by weight of asphalt; an alkali metal base in an amount sufficient to emulsify the asphalt in water and to make the pH of the finished emulsion alkaline; from about 0.1 to about 1.5% by weight of a polyamide product of condensation of polymerized linoleic acid and a polyethylene polyamine, the molecule of which has less than 5 ethylene units and one unit less than the number of amine units, said condensation product being characterized by an average molecular weight in the range from about 3,000 to about 6,500 and a softening point less than about 300° F.; and water, as the continuous phase of the emulsion, to make up 100% by weight.

8. An emulsion as defined in claim 7 wherein said product of condensation is a product of condensation of dilinoleic acid and ethylene diamine.

9. An emulsion as defined in claim 7 wherein said polyamide product of condensation is a product of condensation of dilinoleic acid and diethylene triamine.

10. An emulsion as defined in claim 7 wherein said polyamide product of condensation is a product of condensation of dilinoleic acid and tetraethylene pentamine.

References Cited in the file of this patent

UNITED STATES PATENTS

| | | |
|---|---|---|
| 2,317,959 | Johnson et al. | Apr. 27, 1943 |
| 2,550,476 | Hersberger | Apr. 24, 1951 |

FOREIGN PATENTS

| | | |
|---|---|---|
| 775,917 | Great Britain | May 29, 1957 |